United States Patent [19]

Sasse

[11] B 3,990,958

[45] Nov. 9, 1976

[54] RADIATION POLYMERIZATION OF TRIALLYLAMINES USING A NON-POLAR, NON-HYDROXYLIC SOLVENT

[75] Inventor: Wolfgang Hermann Fritz Sasse, Malvern East, Australia

[73] Assignees: ICI Australia Limited, Melbourne; Commonwealth Scientific and Industrial Research Organization, Campbell, both of Australia

[22] Filed: Dec. 10, 1973

[21] Appl. No.: 423,404

[44] Published under the second Trial Voluntary Protest Program on March 2, 1976 as document No. B 423,404.

[30] Foreign Application Priority Data

Dec. 22, 1972 Australia.............................. 1719/72

[52] U.S. Cl...................... 204/159.22; 204/159.23; 260/2.1 E; 260/874; 526/310; 526/242; 526/266; 526/291

[51] Int. Cl........................... C08f 1/16; C08f 3/84; C08f 15/02

[58] Field of Search................. 204/159.22, 159.23; 260/89.7 N

[56] References Cited

UNITED STATES PATENTS

| | | | |
|---|---|---|---|
| 3,619,394 | 11/1971 | Battaerd ....................... | 260/89.7 N |
| 3,676,398 | 7/1972 | D'Alelio.......................... | 260/47 EP |
| 3,721,648 | 3/1973 | Ehrig et al. .................... | 260/47 UA |
| 3,759,809 | 9/1973 | Carlick et al. ................. | 204/159.23 |
| 3,814,677 | 6/1974 | Battaerd ....................... | 204/159.22 |

Primary Examiner—Murray Tillman
Assistant Examiner—Richard B. Turer
Attorney, Agent, or Firm—Cushman, Darby & Cushman

[57] ABSTRACT

A method of polymerizing a composition comprising a mixture of monomers said monomer mixture containing from 3 to 100% of amines containing two or more allyl groups which method comprises irradiating a solution of a hydrofluoride, hydrochloride or sulphate salt of said amine in a non polar and non hydroxylic solvent with electromagnetic radiation having a wavelength greater than 180 nanometers and preferably less than 800 nano meters preferably in the presence of a radiation sensitizer at a temperature in the range from −80° to +120° C preferably 10° C to 90° C and isolating the polymer so formed.

12 Claims, No Drawings

RADIATION POLYMERIZATION OF TRIALLYLAMINES USING A NON-POLAR, NON-HYDROXYLIC SOLVENT

This invention relates to a process for the polymerisation of allyl amines.

It has been reported that with free radical initiators allylic compounds only polymerise with difficulty to give low molecular weight products (R.C. Laible, Chem. Rev. 58 (5), 807 (1958),). In this reaction polymerisation is inhibited mainly by chain transfer reactions, such as degradative chain transfer. Because of this characteristic, massive amounts of initiator are usually required in allyl polymerisations, the resulting polymers have a low molecular weight and comprise relatively high quantities of terminal catalyst residues.

The free radical polymerisation of allyl compounds such as the di- and tri-allyl monomers leads to cyclic structures by intra molecular polymerisation as well as to network formation. The other mechanism characteristic of allyl polymerisation, namely degradative transfer, is also operative. Consequently crosslinked polymers are obtained which exhibit residual unsaturation as well as measurable quantities of catalyst residues (Encyclopedia of Polymer Science and Technology, 1st Edition, Volume 1, page 755 and following).

The introduction of amino groups into allylic monomers further decreases the reactivity of the allyl bond in polymerisation reactions. Thus, while for example allyl esters can be polymerised by heating in the presence of air, allylamine, diallylamine and triallylamine do not polymerise under conditions applicable to the allyl esters.

It was, however, found that allylamines can be polymerised under special conditions, e.g. in the gas phase (U.S. Pat. No. 3,062,798) or copolymerised when dialkyl peroxides are used as catalysts in conjunction with selected solvents (U.S. Pat. No. 3,057,833).

U.K. Pat. No. 907,079 proposes the production of homopolymers and copolymers of the N-triallylamine salts and N-tetraallyl ammonium salts using massive quantities of initiator; more specifically anion exchange resins can be made by polymerising tetra-allyl ammonium chloride and triallylamine hydrochloride with large amounts of a free radical initiator (British Pat. No. 939,518).

These prior art polymers and processes have certain disadvantages. High doses of catalysts are required, e.g. in British Pat. No. 939,518 between 5 and 20 parts per 100 parts of monomer; consequently large amounts of heteroatoms are retained in the polymer, e.g. 2½ to 5% by weight —$SO_3H$ groups, most probably chemically bound, in the polymer. This represents 0.3 to 0.6 meq/g of a residual acid function which is undesired in a base resin. In line with this, prior art polytriallylamine resins so prepared have a neutralisation capacity of less than 5.5 meq/g, well below their theoretical capacity. Furthermore these prior art polytriallylamines exhibit two other properties, somewhat surprising for a polymer of a trebly unsaturated compound; they have a lower than expected degree of cross-linking and a higher than expected degree of unsaturation. This has been explained, at least in qualitative terms, by Butler; he has shown (J.A.C.S., 77, 1767–9 (1955),) that monomers containing two allyl groups are subject to a cyclic polymerisation which consumes one allyl group and leaves only one double bond per molecule for reaction in linear polymerisation; a linear (or a largely linear) polymer results which is water soluble, i.e. non-swelling and not cross-linked. At least three allyl groups per monomer unit thus are required to attain crosslinking and insolubility. For the latter, triallyl resins, it has furthermore been postulated that an "incestuous" tendency to interpolymerisation exists (R. C. Laible, Enc. of Polymer Science and Technology I, p.758) which causes a reduction in the number of double bonds available for crosslinking.

For certain processes the presence of even relatively small amounts of anionic groups in the amine resins is detrimental.

From the point of view of use of these polymers in the so-called 'Sirotherm' process (Sirotherm is a Trade Mark of ICI Australia for thermally regenerable ion exchange resins) which is described in the publications:

"The Sirotherm Demineralisation Process — an Ion Exchange Process with Thermal Regeneration", part 1, J. Inst. Engr. Aust. (1965) 37, 193;

"An Ion Exchange Process with Thermal Regeneration" Aust. J. Chem. (1966), 19, 561 (Part II), 589 (Part III), 765 (Part IV) and 791 (Part V);

"Thermally Regenerated Ion Exchange Process — An Aid to Water Management", J. Water Poll. Control Fed (1966), 38, 1782; and Australian Pat. No. 274,029, it is significant that polymers of triallylamines made according to the prior art, e.g. British Pat. No. 939,518, are unsatisfactory. They have low capacities and, more importantly, do not satisfy the criterion for a satisfactory Sirotherm anionic resin, that the titration (pH) curve obtained on neutralisation with a strong acid under standard conditions exhibits a pH plateau, i.e. an almost steady pH value over a major part of the titration curve (Australian Pat. No. 274,029). Weiss (Australian Journal of Chemistry 1968, Vol. 21, pp. 2703–2710, "An Ion Exchange Process with Thermal Regeneration", Part VI) has shown that only resins with this characteristic are useful in his thermocycle.

It is known that allylamine salts may be polymerised by irradiation with high energy radiation having a wavelength of less than 10 nano meters, in particular gamma-and beta- rays derived from isotopes or in the form of fast electrons such as produced by a Van de Graaff generator and an electron accelerator. Other sources of ionising or high energy radiation are known in the art, e.g. from British Pat. No. 801,528, page 1, lines 49 – 56; these include neutrons, accelerated heavy particles and X-rays or mixtures of them. A convenient practical source of high energy radiation is a Cobalt 60 source.

The polymers formed using such high energy radiation are suitable for use in the Sirotherm process. However the process has a high energy requirement and requires equipment with a large capital cost.

We have now found a process whereby polymers of triallylamines suitable for Sirotherm may be readily prepared using low energies and low cost equipment.

Accordingly we provide a method of polymerising a composition comprising a mixture of monomers said monomer mixture containing from 3 to 100% of amine containing two or more allyl groups which method comprises irradiating a solution of a hydrofluoride, hydrochloride or sulphate salt of said amine in a nonpolar and nonhydroxylic solvent with electromagnetic radiation having a wavelength greater than 180 nanometers and preferably less than 800 nanometers preferably in the presence of a radiation sensitizer at a temperature in the range from −80° to +120°C preferably 10°C to 90°C and isolating the polymer so formed.

By sensitizer we mean a compound capable of absorbing the electromagnetic radiation and promoting the reaction of the amine containing two or more allyl groups. Suitable sensitizers are known to those skilled in the art for electromagnetic radiation of any given wavelength. Thus for example it is well known to those skilled in the art that ketones such as for example acetone are suitable sensitizers for electromagnetic radiation of wavelength in the region 200–300 nonometers and that certain natural products such as for example riboflavin are suitable sensitizers for sunlight.

A suitable sensitizer for any particular wavelength for light may be found by simple experimentation. We have examined the effect of typical sensitizers chosen from several of the main groups of known sensitizers with the following results.

Aliphatic ketones: Acetone was the preferred sensitizer below 300 nm; diacetyl exhibited less activity. Other aliphatic ketones scanned showed no advantages over acetone.

Aromatic ketones: Benzophenone exhibited a small effect between 300 and 360 nm; acetophenone showed some activity at 300 nm; benzil had very little effect at 360 nm; halogenated acetophenones and benzophenones were effective between 300 and 360 nm but the products were aggregated.

Of several azo compounds studied azo-bis-isobutyronitrile was most effective on a small scale (between 300–360 nm) but it failed on a larger scale.

Peroxides: Di-cumylperoxide and di-tert-butyl peroxide were the most promising compounds in this class. They acted very fast on a small scale but on a larger scale they produced aggregated particles. Benzoin derivatives proved to be the most useful sensitizers. Benzoin itself and alpha-methylbenzoin exhibited marginal activity but substituted or unsubstituted benzoin aryl or lower alkyl ethers wherein the alkyl group contains from 1 to 4 carbon atoms e.g. benzoin methyl ether, allylbenzoin methyl ether, and methylbenzoin methyl ether were active sensitizers between 300 and 400 nm. Above 360 nm riboflavin and chloranil appeared to be effective. Allyl bromide showed activity below 300 nm but less so than acetone.

In certain circumstances impurities present in the amine containing two or more allyl groups may be used as sensitizers and additional sensitizers need not then be added. The amine can also polymerise without a sensitizer with certain ranges of wavelength of electromagnetic radiation.

The nature of the solvent used to dissolve the amine salt is critical to the success of the process of our invention. Although polar solvents such as water, acetonitrile or alcohols dissolve the amine salt no polymerisation occurs when the solvent is irradiated with electromagnetic radiation of wavelength greater than 180 nanometers.

It is a surprising and unexpected feature of our invention that certain nonpolar organic solvents have been found to be satisfactory solvents for amine salts containing two or more allyl groups. It is essential for the polymerisation to occur that the solvent is nonpolar and nonhydroxylic. It is also essential to avoid loss of control of the reaction that the solvent does not appreciably absorb radiation of the wavelength with which the solution is being irradiated. Satisfactory nonpolar solvents for any particular allylamine salt or mixture of allylamine salt may be found by simple experimentation. For most efficient reaction with triallylamine salts we prefer to use solvents chosen from the group consisting of cyclic ethers and aromatic hydrocarbons optionally substituted with chlorine or fluorine. Typical examples of our preferred solvents are dioxan, benzene, chlorobenzene, tetrahydrofuran and mixtures thereof.

The choice of solvent is an important factor affecting the reaction. However the yields of polymer also depend on such factors as concentration of monomers; the rate and intensity of irradiation, rate of stirring, nature and amount of sensitizer and the nature and amount of any impurities present. These factors are interdependent: thus the rate of stirring affects the amount of light absorbed; a more dilute solution will polymerise more slowly but a larger volume admits more light. In practice each of these factors may be optimized separately by one skilled in the art through routine and simple experimentation as shown in the Examples.

We believe, but in no way wish to be bound by the hypothesis, that the function of the sensitizer is to absorb the electromagnetic radiation and to transmit energy of excitation to the monomer which is specific for excitation of the double bond.

Suitable amines containing two or more allyl groups are, for example, triallylamine, diallylamine, 1,4-bis (N,N-diallylaminomethyl) benzine, 1,3,5-tris-(N,N-diallylaminomethyl) benzine, N-(4-N, N-dimethylbenzyl)diallylamine, N-(4-N, N-diallylaminomethylbenzyl) diallylamine, N-(4-N, N-dipropylaminomethylbenzyl)-diallylamine, N-(4-N, N-diisopropylaminomethylbenzyl) diallylamine, alkyldiallylamines and N,N,N′N′-tetraallylalkanediamines.

Other amines containing two or more allyl groups may contain in addition heterocyclic groups.

The reaction, is carried out usually in an inert atmosphere such as nitrogen or argon. The presence of air does not stop the polymerisation, and a small amount of oxygen may even be beneficial but a reduction in yield and capacity is observed when large amounts of oxygen are present. The polymeric beads formed in our process may be used as the basic component of the composite ion exchange particles described in U.S. Pat. No. 3,645,922. For this use the beads should be between 0.1 to 20 microns more preferably in the range from 1 to 3 microns in diameter. It is a very important feature of our invention that beads in this size range may be produced without difficulty. The product formed in the process of our invention under the conditions as described hereinabove as suitable for U.V. initiated polymerisation of allylamine salts to occur, always appears to be in the correct physical form for use in the composite particle manufacture as described in U.S. Pat. No. 3,645,922.

Suitable conditions for the reaction may be found by simple experiments. We have found that when using 100% triallylamine hydrochloride as the monomer in quartz apparatus using light of wavelength 250 to 500 nanometers that a system comprising a ketone such as acetone, as sensitizer; an inert solvent such as an ether, e.g. dioxan and a small amount of water is satisfactory.

The solvent should not react under the influence of the electromagnetic radiation. using this system the reaction mixture should not be stirred for the initial 20 – 90 seconds of the irradiation.

Although the process works well with triallylamine we have found that the reaction is faster in the presence of diallylamine and it appears that the diallylamine accelerates the polymerisation of the triallylamine. Therefore in a preferred aspect of our invention we provide a process as described hereinabove for the polymerisation of a composition comprising a mixture of monomers comprising from 80 to 99% of compound of Formula I:

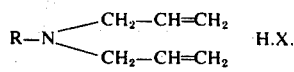

Where R is allyl, alkyl, aryl, substituted aryl, aralkyl or alkaryl; X is halogen; and from 1 to 20% of diallylamine hydrohalide using as initiator U.V. light of wavelength form 180 to 300 nanometers.

We have also found that the reaction can be induced by irradiation with light of wavelengths longer than 300 nanometers, preferably between 300 and 500 nanometers. Under these conditions the reaction can be carried out in standard Pyrex equipment and aromatic solvents can be used besides cyclic ethers. Particles of the desired sizes are readily obtained in good yields and in the presence of suitably chosen sensitizers (see Tables 4, 5) the polymerisation is faster than in quartz, less sensitive to air, and not accelerated by diallylamine. Moreover, when the polymerisation is carried out in Pyrex, the mode of stirring is less critical and there is no need for an initial period without stirring as there is in quartz.

The source of electromagnetic radiation is not critical. Preferably the electromagnetic radiation has a reasonably narrow wavelength range. Suitable sources of radiation are for example sunlight or a low pressure mercury lamp. In a further embodiment of our invention the source of radiation may be a laser beam of suitable wavelength.

The process of our invention may be used as a batch process or more preferably as a continuous process.

We prefer that in a continuous process the mixture of product particles removed as product is of a narrow size range.

By continuous process we mean a process capable of running at a steady state with starting materials being fed in and product being withdrawn in a continuous manner. The separation of the particles into sized fractions may be carried out in any suitable manner by known means. Such means include, for example, the use of screens, sieves, filters, weirs or other means known for the classification of particles. However, we prefer to use centrifugal means of separating the larger particles, for example, a centrifuge or cyclone and in particular a hydrocyclone or bank of hydrocyclones. In a further embodiment of this invention the cyclone or hydrocyclone and the reactor may be combined in one vessel. By hydrocyclone we mean a cyclone designed to classify a slurry of particles in any liquid medium. The design of hydrocyclones is discussed in the book "The Hydrocyclone" by D. Bradley published by the Pergamon Press in 1965. The design of the apparatus and the operating conditions may be optimized by simple experimentation.

Finally it will be appreciated that the polymers formed in accordance with the present invention must differ from the prior art polymers formed either by chemical initiation or high energy radiation initiation. While this difference in structure is difficult to define by chemical or physical analysis, a ready indicator is provided by the significantly increased effective capacity. Therefore the polymers formed by the process described hereinabove form part of our invention.

Our invention is illustrated by, but by no means limited to, the following examples in which all parts are parts by weight unless otherwise specified.

EXAMPLE 1

A solution of triallylamine hydrochloride in water (20.0 ml; 70% w/v) was heated in a rotary evaporator at 100° and 100 mm for 15 minutes. The residue (15.0 g) was dissolved in a mixture of dioxan (40 ml) and acetone (10 ml) and transferred into a quartz tube (6 cm × 30 cm) which was equipped with an efficient reflux condenser with a nonreturn valve, a gas inlet, and a stirrer carrying teflon blades (6 mm wide) which scraped the inside wall of the quartz tube. While high-purity nitrogen was passed through the apparatus the contents of the tube was heated with stirring to the b.p. of acetone for 3 minutes; while a positive pressure of nitrogen was maintained the mixture was cooled to room temperature and the apparatus was immersed into a Raynnet photoreactor equipped with sixteen 8 watt low pressure mercury lamps. The stirrer was stopped, the cooling fan and the lamps were started and after 90 seconds the teflon stirrer was started. After 2 hours the reaction was stopped and the polymer was transferred with acetone into a sintered funnel, dried, to give 6.2 g of a colourless powder. Polymer adhering to the walls of the reactor was removed by heating the quartz tube in boiling water for 2 minutes (weight, 2.8 g). After removal of excess acetone the filtrate was irradiated as before to give a further crop of colourless polymer (2.3 g). The properties of the precipitated material and the material adhering to the walls are shown separately in Table 1.

EXAMPLE 2

Solutions of triallylamine hydrochloride in water (15.4 ml; 70% w/v) and methyldiallylamine hydrochloride (4.6 ml; 70% w/v) were combined and heated at 100° and 100 mm Hg in a rotary evaporator. The residue was dissolved in a mixture of dioxan (30 ml) and acetone (10 ml), transferred into the reactor described in Example 1 and treated as described in Example 1 to give 6.5 g of a colourless polymer; 3.8 g of polymer was removed from the inside walls of the reactor.

EXAMPLE 3

A solution of triallylamine hydrochloride in water (17.0 ml; 70% w/v), 20 ml of acetone, and 25 ml of paraffin oil (Ondina, B.P. quality) were introduced into the reactor described in Example 1. The mixture was heated under nitrogen and with stirring to the b.p. of acetone, cooled, and irradiated as described in Example 1. The product was treated with petroleum, b.p. 60–80°, and acetone to give a pale yellow product (3 g).

EXAMPLE 4

A solution of triallylamine hydrochloride in water (20.0 ml; 70% w/v) was treated as described in Example 1 and the solution in dioxan (30 ml), acetone (10 ml) was transferred into a horizontal photoreactor. This was a pyrex cylinder (8 × 30 cm) sealed at one end by glass, the other end carried a B45 quickfit socket to take a 15 W low pressure mercury lamp (U-shaped 28 cm long, 4 cm between the two arms). On the upper side of the cylinder were an efficient condenser and a gas inlet.

While high-purity dry nitrogen was passed through the apparatus the reactants were heated for 3 minutes to the b.p. of acetone; with the magnetic stirrers operating the mixture was then cooled to ca. 40° and reheated as before. It was then cooled and the stirrers were turned off and the lamp turned on. The magnetic stirrers were operated for intervals of ca. 3 minutes over 2 hours. The reaction mixture was removed from the cylinder with acetone and filtered to give colourless polymer (6.3 g). The properties of the polymer are shown in Table 1.

TABLE I

| Exp. No. | Capacity in meq/g | pH½* at 20°C | ΔpH** | Comments |
|---|---|---|---|---|
| 1 | 6.6 | 7.4 | 0.4 | Polymer deposited on wall of reactor |
| 1 | 6.5 | 7.9 | 0.3 | Polymer from solution |
| 4 | 6.6 | 7.6 | 0.4 | Polymer deposited on wall of reactor. |
| 4 | 6.2 | 7.6 | 0.4 | Polymer from solution |

*pH½ at 20°C is the half neutralisation pH measured at 20°C
**ΔpH is the difference between pH½ at 20°C and pH½ at 80°C.

EXAMPLE 5

A series of experiments was carried out using the following general conditions.
Reactors: Made of Pyrex or clear quartz; 6 cm inner diameter, 30 cm long.
Stirrer: Made entirely of teflon with blades 8 cm long scraping the inside clear; or, made of stainless steel with teflon blades pressed against the walls by springs and sweeping an arc 8 cm long.
Lamps: All lamps were 8 W low pressure lamps as supplied with a 'Rayonet' photoreactor 'Rayonet' is a Trade Mark for a photoreactor); three types were used, clear lamps, maximum output at 254 nm; "White Phosphor" lamps, maximum output near 300 nm; and "Black Phosphor" lamps, maximum output near 360 nm.
Temperature: 30°–40° throughout.
Starting materials: TAA.HCl 70% w/v was dehydrated at 90°/5 mm; all solvents were reagent grade; various sensitizers were prepared according to the literature and were pure by m.p. and tlc. All experiments were carried out under nitrogen except for experiments with AIBN and peroxides using chlorobenzene as solvent which were carried out in air.
Degassing: Each reaction mixture was boiled and cooled under nitrogen before being irradiated.
The triallylamine hydrochloride (70% w/v) was heated at 90°, 2–5 mm for 5 minutes before use.
The reaction conditions for each experiment and the properties of the resultant polymer are shown in the tables. The reaction mixture in each case was initially a clear solution. In each case when a polymer is formed the polymer was in the form of a white free running powder comprising unagglomerated substantially spherical beads of a size in the range from 0.1 to 10 microns diameter.
Table 2. Shows various conditions found satisfactory for formation of product.
Table 3. Illustrates the effect of water in the course of the reaction. The material made in experiments 13–16 is not suitable for use in the 'Sirotherm' process.
Table 4. Illustrates the effect of the nature of sensitizer in the pellet using lighter wavelength 300 nm.
Table 5. Illustrates the effect of using different sensitizers using lighter wavelength 360 nm.
Table 6. Illustrates the effect of altering rate of stirring.
Table 7. Illustrates the effect of altering the duration of the reaction.
Table 8. Illustrates the effect of change of solvent and light sources.
Table 9. Illustrates the effect of altering the quantity of the sensitizer used.
In the Tables TAA.HCl is triallylamine hydrochloride. MBME is methylbenzoin methyl ether. THF is tetrahydrofuran.

TABLE 2

| Expt No | Sensitizer | Monomer | Solvent | Radiation intensity & wavelength | Remarks | Results yield % | capacity meq/g | pH½ in 1100 mg/l NaCl | ΔpH |
|---|---|---|---|---|---|---|---|---|---|
| 1 | None | TAA.HCl (18.5g) | dioxan (35ml) | 254 nm 10 lamps in quartz | 1st ten minutes no stirring Then continuous stirring at 850 rpm for 17 hours | 44 | 7.2 | 7.2 | 0.5 |
| 2 | Acetone (15 mls) | TAA.HCl (14.3g) | dioxan (15 ml) | 254 nm 4 lamps | Continuous stirring at 1150 rpm for 7¾ hours | 84 | 7.3 | 6.9 | 0.4 |
| 3 | None | TAA.HCl (28 g) | dioxan (15 ml) | 300 nm 16 lamps in quartz | No stirring for 1st hr 800 rpm for 1 hour - 15 mls more dioxan added & stirring cont'd for 5 hours | 42 | 7.0 | 7.2 | 0.5 |
| 4 | None | TAA.HCl | Tetra-hydro-furan (15 ml) | 300 nm 6 lamps 254 nm 8 lamps in quartz | No stirring for 1st hr - 15 mls more tetrahydro-furan added & stirring cont'd for 6 hours | 50 | 7.2 | 7.2 | 0.5 |
| 5 | Acetone (15 mls) | TAA.HCl (15.1g) | dioxan (15 ml) | 300 nm 4 lamps in Pyrex | Continuous stirring at 1150 rpm for 7¾ hours | 27 | 7.0 | 7.2 | 0.5 |
| 6 | MBME | TAA.HCl | tetra- | 360 nm | 1 hour continu- | 57 | 6.7 | 7.2 | 0.6 |

TABLE 2-continued

| Expt No | Sensitizer | Monomer | Solvent | Radiation intensity & wavelength | Remarks | yield % | capacity meq/g | pH½ in 1100 mg/l NaCl | ΔpH |
|---|---|---|---|---|---|---|---|---|---|
| | (0.175g) | (14.0g) | hydrofuran (60 ml) | 16 lamps in Pyrex | ous stirring at 950 rpm | | | | |
| 7 | MBME (0.35g) | TAA.HCl (14.0g) | tetrahydrofuran (60 ml) | 360 nm 16 lamps in Pyrex | 2 hours continuous stirring at 950 rpm | 85 | 6.8 | 7.2 | 0.8 |
| 8 | MBME (0.175g) | TAA.HCl (14.0g) | tetrahydrofuran (60 ml) | 360 nm 16 lamps in Pyrex | 1 hour continuous stirring at 950 rpm | 80 | 7.0 | 7.2 | 0.5 |
| 9 | MBME (0.35g) | TAA.HCl (14.5g) | tetrahydrofuran (60 ml) | 300 nm 16 lamps in Pyrex | 1 hour continuous stirring at 800 rpm | 38 | 6.8 | 7.0 | 0.7 |
| 10 | MBME (0.45 g) | TAA.HCl (40g) | Benzene (60 ml) Benzene (130 ml) | 360 nm 16 lamps | 1 hour continuous stirring at 900 rpm | 70 | 7.4 | 7.0 | 0.6 |
| 11 | '' | '' | Chlorobenzene (130 ml) | '' | '' | '' | '' | '' | '' |
| 12 | None | TAA.HCl (27g) | dioxan (15 ml) | 300 nm 6 lamps 254 nm 8 lamps in quartz | 1 hour no stirring, 15 ml dioxan added & stirred for 6 hours | 50 | 7.2 | 7.2 | 0.5 |

TABLE 3

Effect of water

| Expt No | Sensitizer | Monomer | Solvent | Radiation intensity & wavelength | Remarks | yield % | capacity meq/g | pH½ in 1100 mg/l NaCl | ΔpH |
|---|---|---|---|---|---|---|---|---|---|
| 13 | Acetone (0.5 g) | TAA.HCl (14.5 g) | $H_2O$ (5 ml) | 4 × 15 W 254 nm | 1 hr continuous stirring at 500 rpm | 30 | 1.85 | — | — |
| 14 | — | '' | '' | '' | '' | <5 | — | — | — |
| 15 | — | '' | dioxan (15 ml) $H_2O$ (5 ml) | '' | '' | 12 | 3.5 | — | — |
| 16 | Acetone (10 ml) | '' | dioxan (42 ml) $H_2O$ (6 ml) | '' | '' | 21 | 4.8 | — | — |
| 1 | See experiment 1 on page 13 | | | | | 41 | 6.6 | 7.4 | 0.4 |

TABLE 4

Different sensitizers at 310 nm

| Expt No | Sensitizer | Monomer | Solvent | Radiation intensity & wavelength | Remarks | yield % | capacity meq/g | pH½ in 1100 mg/l NaCl | ΔpH |
|---|---|---|---|---|---|---|---|---|---|
| 17 | α-allyl-benzoin methyl ether (.3 g) | TAA.HCl (14.4g) | dioxan (30 ml) | 16 × 310 nm lamps | 4 hrs continuous stirring at 800 rpm | 60 | 7.1 | 7.2 | 0.6 |
| 18 | Acetone (0.5 g) | TAA.HCl (14.4g) | THF (30 ml) | '' | 6 hrs '' | 38 | — | — | — |
| 19 | Acetone (25 ml) | TAA.HCl (27.7g) DAA.HCl (4.0 g) | THF (25 ml) | '' | 6 hrs '' | 51 | 7.3 | 7.7 | 1.0 |
| 20 | MBME (0.3 g) | TAA.HCl 14 g | THF (30 ml) | '' | 4 hrs '' | 61 | 7.0 | 7.2 | 0.5 |

TABLE 5

Different sensitizers at 360 nm

| Expt No | Sensitizer | Monomer | Solvent | Radiation intensity & wavelength | Remarks | Results | | | |
|---|---|---|---|---|---|---|---|---|---|
| | | | | | | yield % | capacity meq/g | pH½ in 1100 mg/l NaCl | ΔpH |
| 21 | Methyl-benzoin (0.30g) | TAA.HCl (14.8g) | benzene (120 ml) | 360 nm 16 lamp | 1 hr continuous stirring at 500 rpm | 50 | — | — | — |
| 22 | Benzoin-methyl ether (0.30g) | " | " | " | " | 82 | — | — | — |
| 23 | MBME (0.30g) | " | " | " | " | 73 | — | — | — |
| 24 | AIBN (0.30g) | " | " | " | " | <10 | — | — | — |
| 25 | Benzil (0.30g) | " | " | " | " | <5 | — | — | — |

TABLE 6

Rate of stirring 300 nm MBME

| Expt No | Sensitizer | Monomer | Solvent | Radiation intensity & wavelength | Remarks | Results | | | |
|---|---|---|---|---|---|---|---|---|---|
| | | | | | | yield % | capacity meq/g | pH½ in 1100 mg/l NaCl | ΔpH |
| 26 | MBME (0.35g) | TAA.HCl (14.5g) | THF (60 ml) | 16 × 300 nm | 1 hr continuous stirring at 500 rpm | 13 | — | — | — |
| 9 | already listed | | | | | 38 | — | — | — |
| 27 | MBME (0.35g) | TAA.HCl (14.5g) | THF (60 ml) | 16 × 300 nm | 1 hr continuous stirring at 1100 rpm | 51 | — | — | — |

TABLE 7

Effect of time at 250 rpm 360 nm

| Expt No | Sensitizer | Monomer | Solvent | Radiation intensity & wavelength | Remarks | yield % | capacity meq/g | pH½ in 1100 mg/l NaCl | ΔpH |
|---|---|---|---|---|---|---|---|---|---|
| 28 | MBME (0.35g) | TAA.HCl (14.0g) | THF (60 ml) | 16 × 360 nm | 1 hr continuous stirring at 950 rpm | 73 | — | — | — |
| 29 | " | " | " | " | ½ hr " | 53 | — | — | — |
| 30 | " | " | " | " | ¼ hr " | 25 | — | — | — |
| 7 | | | already listed | | 2 hrs " | 85 | 6.8 | 7.2 | 0.8 |

TABLE 8

Different solvents and light sources

| Expt No | Sensitizer | Monomer | Solvent | Radiation intensity & wavelength | Remarks | yield % | capacity meq/g | pH½ in 1100 mg/l NaCl | ΔpH |
|---|---|---|---|---|---|---|---|---|---|
| 31 | — | TAA.HCl | acetone (30 ml) | 254 nm 4 × 15 W lamps | 2 hrs continuous stirring at 900 rpm | none | — | — | — |
| 32 | MBME (0.3g) | " | acetone (60 ml) | 310 nm 16 lamps | 1 hr continuous stirring | " | — | — | — |
| 33 | " | " | dimethylmide (60 ml) | " | " | " | — | — | — |
| 34 | " | " | acetone (65 ml) | 360 nm 16 lamps | " | " | — | — | — |
| 35 | MBME (0.175g) | TAA.HCl (18.4 g) | benzene (20 ml) | 360 nm 16 lamps | 1 hr continuous stirring at 1150 rpm | No product | | | |
| 36 | MBME (0.320 g) | TAA.HCl (153 g) | acetone (60 ml) | " | 1 hr continuous stirring at 900 rpm | 20 | — | — | — |

TABLE 9

Quantity of MBME at 360 nm in THF, Benzene

| Expt No | Sensitizer | Monomer | Solvent | Radiation intensity & wavelength | Remarks | yield % | capacity meq/g | Results pH½ in 1100 mg/l NaCl | ΔpH |
|---|---|---|---|---|---|---|---|---|---|
| 37 | MBME (0.09g) | TAA.HCl (14.5 g) | THF (60 ml) | 16 × 360 nm | 1 hr continuous stirring at 950 rpm | 34 | — | — | — |
| 6 | | | already listed | | | 57 | 6.7 | 7.2 | 0.6 |
| 38 | MBME (0.35g) | TAA.HCl (14.5 g) | THF (60 ml) | 16 × 360 nm | 1 hr continuous stirring at 950 rpm | 73 | — | — | — |
| 39 | MBME (0.17 g) | " | benzene (60 ml) | " | " | 39 | — | — | — |
| 40 | MBME (0.35 g) | " | " | " | " | 44 | 7.0 | 7.0 | 0.5 |
| 41 | MBME (0.30 g) | TAA.HCl (14.5 g) | benzene (120 ml) | 16 × 360 nm | 1 hr continuous stirring at 250 rpm of No 40 effect of dilution | 71 | 7.2 | 7.0 | 0.5 |
| 442 | MBME (0.35 g) | " | benzene (60 ml) THF (60 ml) | " | 1 hr continuous stirring at 250 rpm of No 9 effect of wavelength | 79 | 7.0 | 7.2 | 0.5 |

EXAMPLE 6

The polytriallylamine particles prepared according to the method of Example 2 were incorporated into a composite particle together with crosslinked polymethacrylic acid particles, using the method of U.S. Pat. No. 3,645,922. A slurry of 31 g of the polytriallylamine hydrochloride particles in 440 ml of water was slowly poured into a stirred slurry of 35 g of crosslinked polymethacrylic acid particles, size 1 to 5 microns, in 783 ml of water.

The mixture was acidified to pH 1.5 with hydrochloric acid then filtered. 66 g of "GELVATOL 20–30" (Trade Mark for a polyvinyl alcohol of low molecular weight, 88% hydrolyzed) was added to the collected filter cake together with water sufficient to give a total weight of slurry of 666 g. The components were intimately mixed and the pH of the system adjusted to 1.5 with hydrochloric acid.

Glutaraldehyde (29.7 ml of a 25% solution in water) was stirred into the slurry, and the mixture was dispersed in oil heated to 60°C. After 2 hrs the uncured composite resin beads were removed and washhed in a basket centrifuge with hot water to remove any oil adhering to them. They were then rinsed with acetone, sucked dry on the filter, and heated in an air oven at 100°–110°C for 60 min. The product beads were sieved and the 16–60 mesh BSS fraction retained.

Column operation demonstrating the use of the resin beads in a thermally regenerable ion - exchange process was performed as described below.

About 80 ml of the resin beads were stirred in aqueous saline containing 1000 p.p.m. of sodium chloride, and 0.3N alkali was added at room temperature until the pH of the slurry was 7.3. The resin was then packed in a jacketed column. Cold (20°C) 1000 p.p.m. sodium chloride solution and hot (80°C) 500 p.p.m. sodium chloride solution were passed alternatively through the column, at a flow rate of 1.6 gall/cu.ft./min. Sodium chloride was released from the resin to the regenerant feed during the hot cycle, to yield a more concentrated solution as the effluent, and absorbed from the feed solution during the cold cycle, to yield a more dilute solution as the product. The operation was carried out by the method described in U.S. Pat. No. 3,425,937 to give a 64% yield of product water, comprising 9.5 bed volumes of 380 p.p.m. sodium chloride solution, together with 5.3 bed volumes of 1630 p.p.m. sodium chloride solution which made up the effluent. The operating capacity of the bed was 0.10 meq/ml.

The process was also demonstrated on a mixed water containing sodium and calcium chlorides, present in the amounts of 1000 p.p.m. and 111 p.p.m. respectively. The resin was first equilibrated to the higher pH level of 7.8. A 70% yield of product was obtainied, comprising 9.4 bed volumes of a solution containing a total of 506 p.p.m. of dissolved salts, together with 4.1 bed volumes of effluent containing 1870 p.p.m. of dissolved salts. The operating capacity of the bed was again 0.10 meq/ml.

I claim:

1. In the process of polymerising a composition comprising a mixture of monomers said monomer mixture containing from 3 to 100% of amines chosen from the group consisting of triallylamine, diallylamine, 1,4-bis(N,N-diallylaminomethyl) benzene, 1,3,5-tris-(N,N-diallylamino-methyl) benzene, N-(4-N,N-dimethylbenzyl)diallylamine, N-(4-N,N-diallylaminomethylbenzyl) diallylamine, N-(4-N,N-dipropylaminomethylbenzyl) diallylamine, N-(4-N,N-diisopropylaminomethylbenzyl) diallylamine, alkyldiallylamines and N,N,N',N'-tetraallylalkanediamines, which method comprises irradiating a solution of a hydrofluoride, hydrochloride or sulphate salt of said amine with electromagnetic radiation and isolating the polymer so formed, the improvement comprising using radiation having a wavelength greater than 180 nanometers at a temperature in the range from −80° to 120°C and using a non-polar and non-hydroxylic solvent.

2. A process according to claim 1 wherein the electromagnetic radiation has a wavelength less than 800 nm.

3. A process according to claim 1 wherein the process is carried out in the presence of a radiation sensitizer.

4. A process according to claim 3 wherein the electromagnetic radiation has a wavelength in the range from 180 to 300 nm and wherein the radiation sensitizer is a ketone or allyl bromide.

5. A process according to claim 3 wherein the electromagnetic radiation has a wavelength in the range from 300 to 400 nm and wherein the radiation sensitizer is chosen from the group consisting of halogenated acetophenones, halogenated benzophenones, azo-bis-isobutyronitrile, peroxides, riboflavin, chloranil, and benzoin derivatives.

6. A process according to claim 5 wherein the radiation sensitizer is chosen from the group consisting of aryl or lower alkyl ethers of benzoin, allyl benzoin or methylbenzoin.

7. A process according to claim 1, wherein the reaction is carried out at a temperature in the range from 10° to 90°C.

8. A process according to claim 1, wherein the allylamine salt is dissolved in a nonpolar, nonhydroxylic organic solvent which does not absorb radiation of the wavelength of electromagnetic radiation used in the reaction.

9. A process according to claim 8 wherein the organic solvent is chosen from the group consisting of cyclic ethers and aromatic hydrocarbons optionally substituted with chlorine or fluorine and the allylamine salt is a salt of triallylamine.

10. A process according to claim 8 wherein the organic solvent is chosen from the group consisting of dioxan, benzene, chlorbenzene, tetrahydrofuran and mixtures thereof and the allylamine salt is a salt of triallylamine.

11. A process according to claim 1, for the polymerisation of a composition comprising a mixture of monomers comprising from 80 to 99% of compound of Formula I:

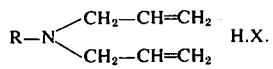

where R is allyl, alkyl, aryl, substituted aryl, aralkyl or alkaryl; X is halogen; and from 1 to 20% of diallylamine hydrohalide using as initiator U.V. light of wavelength from 180 to 300 nm.

12. A process according to claim 1 wherein the initiator is light of wavelength 300 to 500 nm and the reaction is carried out in a pyrex glass reactor in the presence of a radiation sensitizer.

* * * * *